United States Patent
Tanioka

(10) Patent No.: US 7,359,102 B2
(45) Date of Patent: Apr. 15, 2008

(54) DRIVING METHOD FOR GALVANO SCANNER

(75) Inventor: Nozomu Tanioka, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 561 days.

(21) Appl. No.: 10/908,228

(22) Filed: May 3, 2005

(65) Prior Publication Data

US 2005/0277305 A1   Dec. 15, 2005

(30) Foreign Application Priority Data

May 27, 2004 (JP) ............................. 2004-157309

(51) Int. Cl.
*G02B 26/08* (2006.01)
(52) U.S. Cl. .................. 359/199; 359/198; 359/213; 359/214; 359/900
(58) Field of Classification Search ............... None
See application file for complete search history.

(56) References Cited

U.S. PATENT DOCUMENTS 5,187,364 A * 2/1993 Blais ..................... 250/236
5,848,188 A * 12/1998 Shibata et al. .......... 382/203

* cited by examiner

*Primary Examiner*—James Phan
(74) *Attorney, Agent, or Firm*—Buchanan Ingersoll & Rooney PC

(57) ABSTRACT

A galvano scanner system has a galvano scanner and a scanner driver for driving the scanner, wherein a microcomputer for generating commands in which digital data representing a drive pattern of the scanner is written is mounted in the scanner driver. The microcomputer for generating commands is actuated by an external or internal trigger signal, and the digital data of the drive pattern is sequentially output. The output data is converted to an analog signal in a DA converter, and a drive control circuit generates a drive signal of the scanner on the basis of the analog signal to drive the galvano scanner. A system that can optimally drive a galvano scanner can be achieved with a small inexpensive system configuration.

5 Claims, 4 Drawing Sheets

(WAVEFORM DATA 100)

DRIVING METHOD FOR GALVANO SCANNER

BACKGROUND OF THE INVENTION

1. Field of the Invention

The present invention relates to a driving method that can optimally drive a galvano scanner using a small and inexpensive system configuration, and to a galvano scanner system and driver for driving a galvano scanner using the driving method.

2. Description of the Related Art

To drive a galvano scanner (analog input/output type) in an arbitrary drive pattern, a drive command must be fed from an external command generator to its scanner driver in real time. The command generator is configured with a function generator, or a personal computer and a DA converter.

When the galvano scanner is driven from a certain position A to a target position B, for example, the value of a command voltage fed to the scanner driver (analog driver) must be changed from a command voltage value a corresponding to the position A to a command voltage value b corresponding to the position B. The command voltage that is output from the command generator is merely changed to the value b that corresponds to the final target position B. A path from the position A to the position B and arrival time must therefore be set by adjusting the scanner driver.

When the difference between the command voltage values a and b is large, the scanner driver must be adjusted so that the galvano scanner can be driven without an increase in an overshoot amount. FIG. 4A is a diagram showing the command input and the actual movement of the galvano scanner after the scanner driver has been adjusted so that overshooting does not occur. FIG. 4B is a diagram showing the command input and the scanner movement when overshooting has occurred without adjustment. As is apparent from the diagrams, when adjustment is made to eliminate overshooting, a lengthy amount of time is required until settling is completed. To avoid this situation, a method is commonly adopted whereby adjustments are made so as to input a command input waveform provided with a gradient from the command generator to the scanner driver and to optimize the scanner driver to the command input waveform when moving from the command voltage value a to b. FIG. 4C shows the actual movement of the scanner with respect to the command input having the gradient.

However, a command generator that is capable of generating such a command input waveform requires a function generator, special-purpose controller, PC, DA converter, and other high-function hardware, which leads to a larger, more expensive galvano scanner drive system.

Due to differences in service equipment and the like, it is possible that the command input waveform that is set in the command generator by the user may not necessarily match the input waveform from the command generator that was envisioned when adjusting the scanner driver. When the command input waveform that is input to the scanner driver is offset with respect to the input waveform that was envisioned at the time of the adjustment, vibrations and other unstable actions may be generated in the scanner, and stable driving and high-speed driving of the scanner may be compromised.

In view of the above, a main object of the present invention is to provide a driving method that can optimally drive a galvano scanner using a small and inexpensive system configuration, and to provide a galvano scanner system and driver.

SUMMARY OF THE INVENTION

To attain the above and other objects, a driving method for a galvano scanner according to the present invention comprises steps of:

mounting a sensor or driver of the galvano scanner with a microcomputer for generating commands in which digital data representing a drive pattern of the galvano scanner is written;

actuating the microcomputer for generating commands and sequentially outputting the digital data of the drive pattern by an externally input trigger signal or an internally generated trigger signal, converting the output digital data to an analog signal, and generating a drive signal of the scanner on the basis of the analog signal.

In the present invention, the digital data representing the drive pattern may be written in a rewritable state in the microcomputer for generating commands.

Next, a scanner driver of the present invention scanner driver comprises:

a microcomputer for generating commands that is provided with a memory in which digital data representing a drive pattern of a galvano scanner is written, and that is actuated by an externally input trigger signal or an internally generated trigger signal to sequentially output the digital data of the drive pattern, a DA converter for converting the output digital data to an analog signal, and a drive control circuit for generating a drive signal of the galvano scanner on the basis of the analog signal.

In the present invention, a type of memory in which the digital data representing the drive pattern can be written in a rewritable state may be used as the memory.

In addition, a galvano scanner system of the present invention comprises:

a galvano scanner, and a scanner driver for driving the galvano scanner, wherein the scanner driver has the above-described configuration.

In the present invention, the microcomputer for generating commands in which drive patterns are written is mounted in the special-purpose driver (scanner driver) of the galvano scanner. For this reason, a command that can drive the galvano scanner with a preset drive pattern is generated if a pulse or another simple trigger signal is input to the driver. A large, expensive command generator is therefore not required to be connected to the outside.

In contrast to the case in which a drive pattern is set in an external command signal generator and a command signal is input therefrom to the scanner driver, the offset of the command signal that occurs between when the driver is optimally adjusted and during actual use can be controlled, and variability in the noise level of the command signal can be minimized. The galvano scanner can therefore be driven with stability and high precision.

DESCRIPTION OF THE PREFERRED EMBODIMENTS

A galvano scanner system according to the present invention will be described with reference to the drawings.

Figure 1:
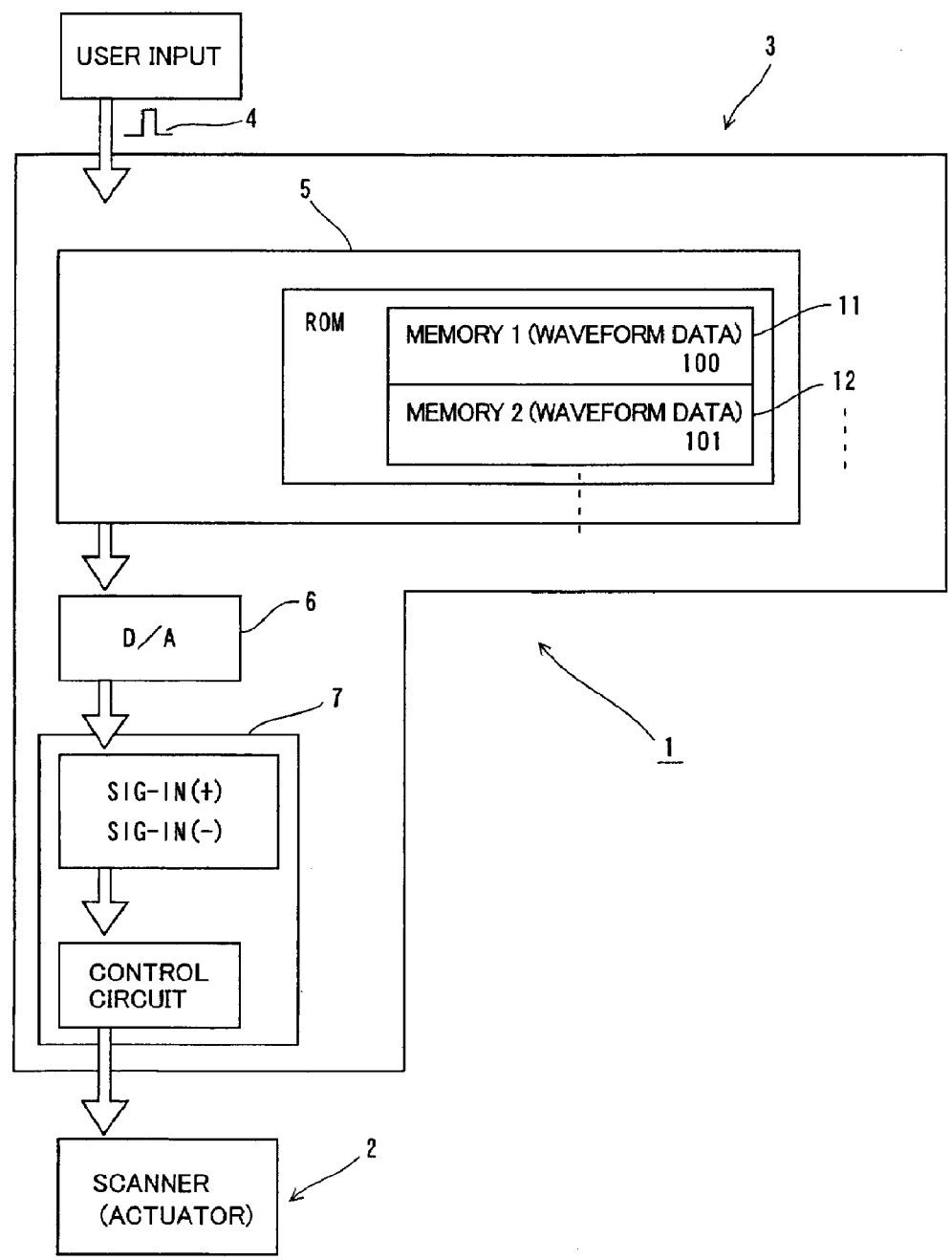
FIG. 1 is a schematic block diagram of a galvano scanner system according to the present invention.

FIG. 1 is a schematic block diagram of a galvano scanner system of the present example. A galvano scanner system 1 has a galvano scanner 2 and a scanner driver 3 for drive-controlling the galvano scanner 2. The scanner driver 3 is configured to be actuated and to drive the scanner 2 when a user inputs an input signal 4. The scanner driver 3 is provided with a microcomputer 5 for generating commands, a DA converter 6 for analog-converting digital signals output from the microcomputer, and a drive control circuit 7 for generating a scanner drive signal on the basis of the analog-converted command signal and applying the signal to the scanner 2.

Figure 2:
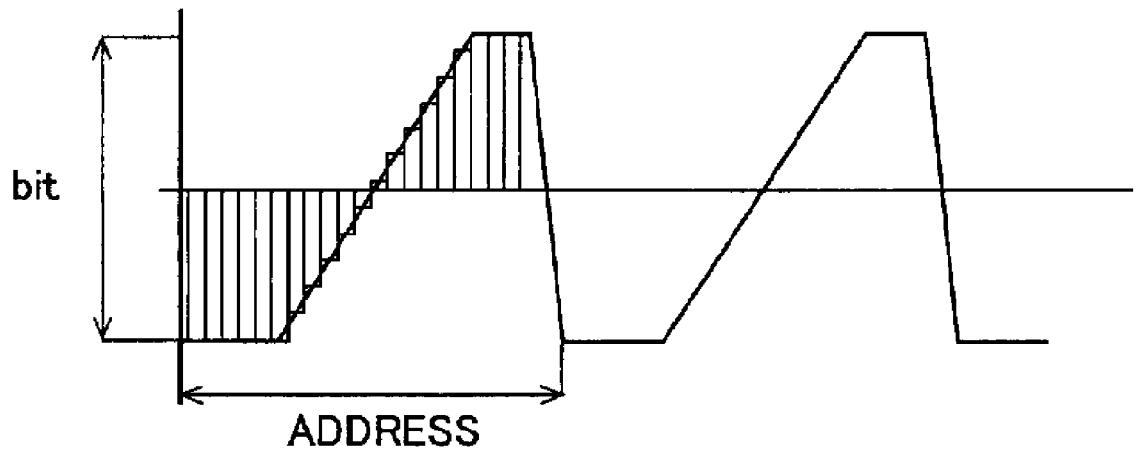
FIG. 2 is a diagram showing an example of a waveform data written to a microcomputer for generating commands of a driver.

The microcomputer 5 for generating commands is provided with a CPU, ROM, and RAM. The ROM has storage areas 11, 12, and so forth in which digital data 100, 101, and so forth of periodic arbitrary command input waveforms are written. The digital data may be stored in a rewritable state. FIG. 2 is a conceptual view of waveform data 100 written to the storage area 11.

Figures 3A, 3B, 3C, 3D:
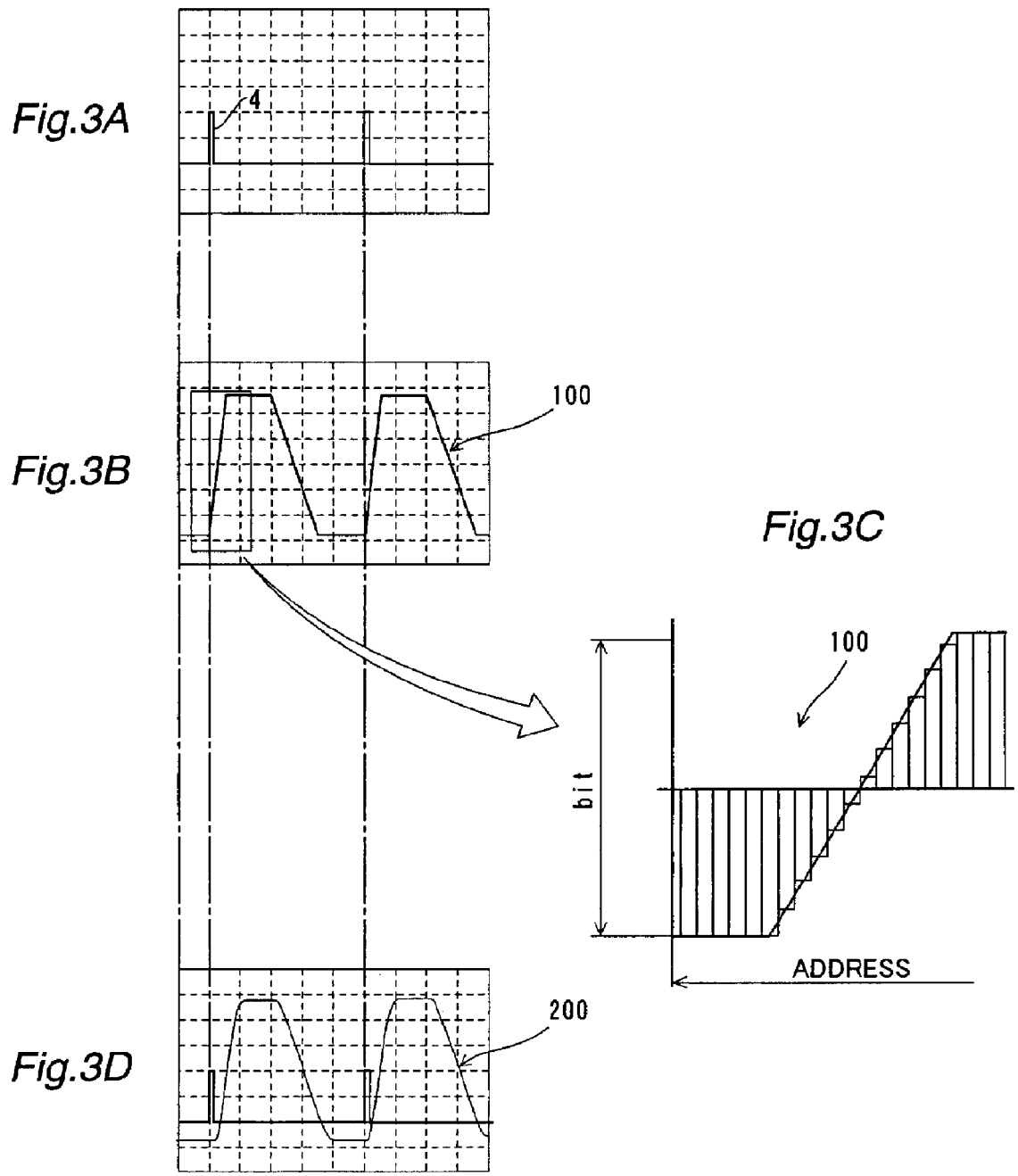
FIGS. 3A to 3D are diagrams showing the operation of the system of FIG. 1.
Figure 4A:
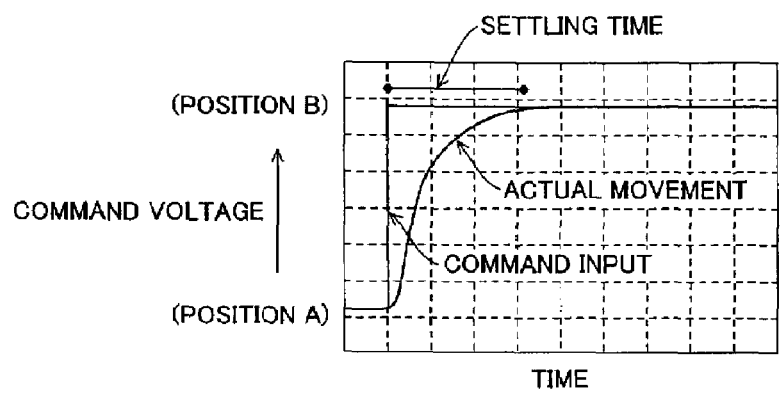
FIGS. 4A to 4C are diagrams showing the operation of the galvano scanner with respect to the input command waveform.
Figure 4B:
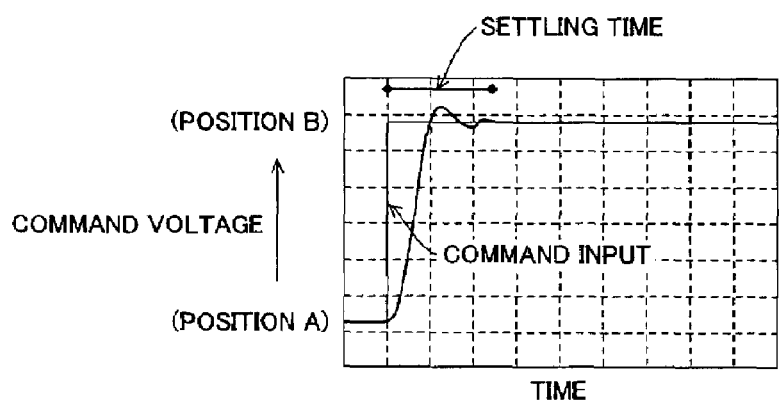
Figure 4C:
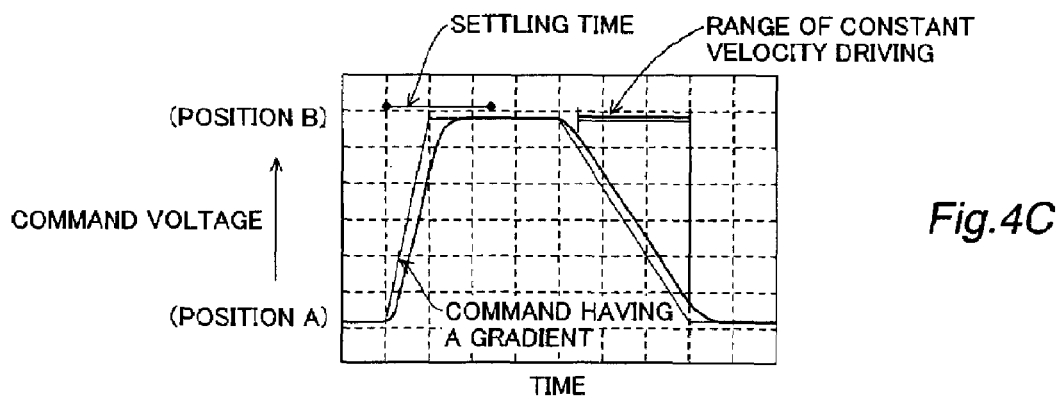

FIGS. 3A to 3C are diagrams showing examples of the operation of the galvano scanner system 1. A description is provided below with reference to the diagrams. A simple start signal, for example, a pulse signal of several millivolts or several volts, is used as the input signal 4 that is input by the user, as shown in FIG. 3A. When the input signal 4 is input to the scanner driver 3, the microcomputer 5 for generating commands sequentially outputs the digital data 100 of the command waveform from one of the storage areas of the ROM in which predesignated command input waveforms are stored, for example, from the storage area 11 (FIGS. 3B, 3C).

The digital data 100 thus output is converted to an analog value in the DA converter 6 and fed to the drive control circuit 7. The drive control circuit 7 amplifies or otherwise processes the analog value thus fed, generates a drive voltage corresponding to the command input waveform, and feeds the voltage to the scanner 2. The scanner 2 is thereby iteratively driven with a drive pattern 200 corresponding to the input signal waveform, namely digital data 100 of the command waveform, as shown in FIG. 3D.

The microcomputer 5 for generating commands may, for example, be actuated in synchronization with power-on to generate output corresponding to a prescribed input command waveform without relying on user input. Besides user input, the trigger signal for actuation may be generated by a sequencer, and a stop signal may also be manual input, sequencer output, or the like.

The galvano scanner system 1 of the present example has the following advantages.

(1) The required hardware for generating analog command input is considerably simplified. More specifically, a function generator, special-purpose controller, PC, DA converter, and other high-function hardware are not required, and the size and cost of the system can be reduced overall.

Describing this point in greater detail, command input equipment having corresponding velocity and resolution is required to make use of the scanner system capacity, which has a settling time of several hundred microseconds and a iterative positioning accuracy of 1 second or less in analog drivers in current use, and the overall cost of the system is increased.

In other words, in a common DA converter, since a resolution of the command is determined by assigning a command voltage of 20 V (p-p), for example, to a bit resolution, the command input is limited to 1.08-second intervals even when a 16-bit DA converter is used (when the driver scale adjustment is 1 V=1° at time of adjustment). In this situation, there are applications (applications in which high precision in a very small range is required, for example) in which the capacity is inadequate for a scanner system such as one that guarantees an iterative positioning precision of 1°.

In contrast to the above situation, the system of the present example can assign an actually required very small range to a maximum bit value of a recording data, and a command resolution of 1 second or less can be achieved without using high-function expensive dedicated equipment.

(2) The command input waveform and the waveform at the time of adjustment are the same, and stability is improved. More specifically, there is a possibility that the command input waveform by the user may not necessarily match the waveform at the time of adjustment due to following differences and other factors in the service equipment.

Resolution of the DA converter (8 bit, 16 bit)

Impossibility of ignoring noise from a connection cable with increased resolution of the DA converter Input accuracy of the command waveform (the gradient may be different)

Operating speed of the PC (velocity reduction and momentary loss of command signal due to the OS of the PC)

Since stability and high-speed driving of the scanner system are made possible by making optimal adjustments to the actual drive command waveform, mismatches between the command input waveform by the user and the waveform at the time of adjustment may cause vibrations and other forms of instability. In the system of the present example, however, the driving can be performed with the same command as that of at the time of adjustment without relation to the configuration of the user devices.

(3) It is possible to remain stopped at an arbitrary position until a next start signal is input, and conventional control that continues to input an offset voltage is no longer required.

(4) The galvano scanner is often used in applications involving high-frequency operations with very small amplitude at which a rolling element inside a bearing that supports the drive shaft of the scanner does not perform a full rotation, and lifespan degradation due to local lack of grease lubrication of the bearing is often viewed as a problem. Methods for performing grease lubrication by periodically combining operations across a wide range can be cited as examples of countermeasures to lifespan degradation. The system of the present example can count the number of reciprocating movements (reset when power is switched off), operate across a wide range for grease lubrication, and handle other operations in a simple manner. The system can also handle more-complex self-check routines such as bearing damage checking (preservation and comparison of following signals).

OTHER EMBODIMENTS

In the above-described system, a ROM in which the digital data of drive patterns is written is housed in the scanner driver. It is also possible to house such a ROM in the scanner sensor.

The system of the present invention can be used in image processing, measuring equipment, shutters, and other cases in which specified operations must be carried out in an iterative fashion.

What is claimed is:

1. A driving method for a galvano scanner, comprising steps of:
    mounting a sensor or driver of the galvano scanner with a microcomputer for generating commands in which digital data representing a drive pattern of the galvano scanner is written;
    actuating the microcomputer for generating commands and sequentially outputting the digital data of the drive pattern by an externally input trigger signal or an internally generated trigger signal,
    converting the output digital data to an analog signal, and
    generating a drive signal of the scanner on the basis of the analog signal.

2. The driving method for a galvano scanner according to claim 1, wherein the digital data representing the drive pattern is written in a rewritable state in the microcomputer for generating commands.

3. A scanner driver comprising:
    a microcomputer for generating commands that is provided with a memory in which digital data representing a drive pattern of a galvano scanner is written, and that is actuated by an externally input trigger signal or an internally generated trigger signal to sequentially output the digital data of the drive pattern,
    a DA converter for converting the output digital signal to an analog signal, and
    a drive control circuit for generating a drive signal of the galvano scanner on the basis of the analog signal.

4. The scanner driver according to claim 3, wherein the digital data representing the drive pattern is written in a rewritable state in the memory.

5. A galvano scanner system comprising:
    a galvano scanner, and
    a scanner driver for driving the galvano scanner,
    wherein the scanner driver is the scanner driver according to claim 3 or 4.

* * * * *